United States Patent
Watanabe

[15] 3,703,130
[45] Nov. 21, 1972

[54] ELECTRONIC SHUTTER CONTROL DEVICE
[72] Inventor: Asao Watanabe, Tokyo, Japan
[73] Assignee: Nippon Kogaku K.K., Tokyo, Japan
[22] Filed: March 23, 1971
[21] Appl. No.: 127,288

[30] Foreign Application Priority Data
April 6, 1970 Japan ......................45/29184

[52] U.S. Cl...............95/10 CT, 95/53 EB, 250/206, 307/117, 307/220
[51] Int. Cl........G03b 7/08, G03b 9/58, H03k 17/00
[58] Field of Search.......95/10 C, 10 CT, 53 R, 53 E, 95/53 EA, 53 ER; 307/220, 293, 311, 117; 250/206, 215

[56] References Cited
FOREIGN PATENTS OR APPLICATIONS
1,284,280  11/1968  Germany.................95/10 CT Primary Examiner—Joseph F. Peters, Jr.
Attorney—Ward, McElhannon, Brooks & Fitzpatrick

[57] ABSTRACT

The electronic shutter device of this invention eliminates the prior art circuit which required extremely high insulation so as to hold the charge. In this invention, the current of photosensitive element proportional to the intensity of light of an object is converted into a voltage proportional to a logarithm of said current. Said voltage is compared with a voltage induced by a correction current for setting a film speed and a current of which magnitude being varied in response to a number of pulses counted by a binary counter. When the difference between these voltages reaches a predetermined value, the counter stops its counting. When the shutter is actuated a current proportional to an exponential of a voltage representative of the number of counting is integrated as the shutter is opened until the integrated value reaches a predetermined level at which time the shutter is closed.

10 Claims, 1 Drawing Figure

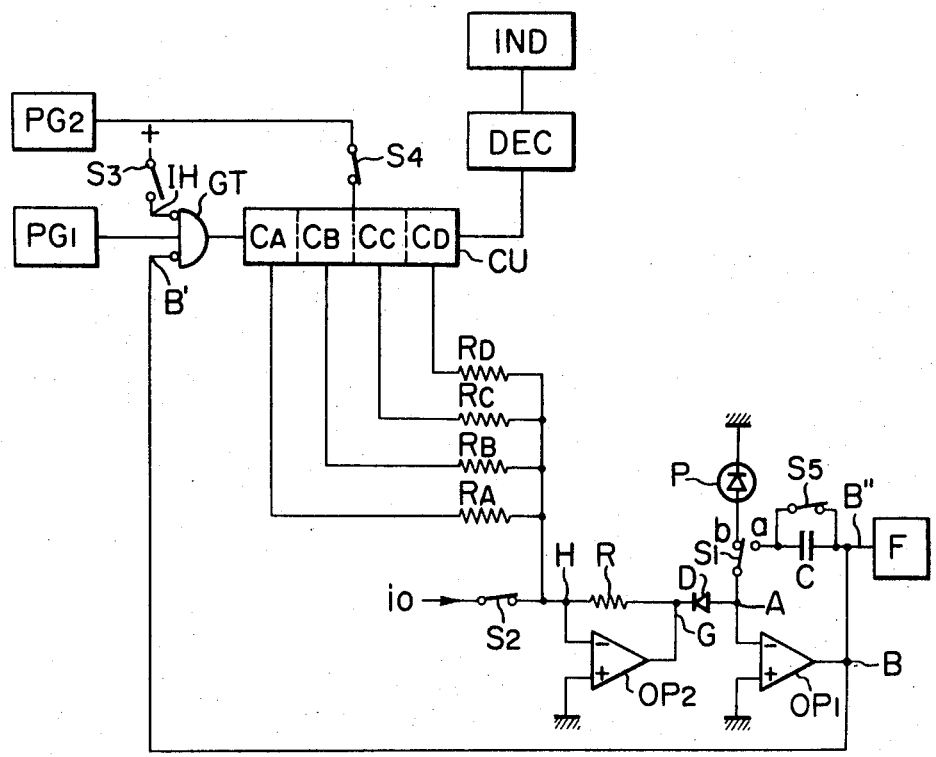

3,703,130

ELECTRONIC SHUTTER CONTROL DEVICE

BACKGROUND OF THE INVENTION

1. Field of The Invention

The present invention relates to an electronic shutter device.

2. Description of The Prior Art

In general in a TTL type camera having an electronic shutter, the intensity of light from an object to be photographed is converted into an electrical signal by photosensitive element disposed backwardly of a camera lens. In order to automatically control an exposure time by the electric signal thus obtained, the intensity of light measured immediately before a mirror is moved upward must be temporarily stored so that an exposure time may be precisely controlled based upon this stored information. For this purpose there has been proposed a method in which an electrical signal generated by the photosensitive element representative of the intensity of light in proportion to its logarithmic value is stored in a memory element such as a capacitor so that a shutter control signal in proportion to an exponential of the stored voltage may be derived when the shutter is actuated. In addition there have been known various methods wherein the capacitors are employed as the memory elements so that the circuits having a high insulation resistance must be constructed in order to hold the charge of the capacitors. The electronic shutter device must indicate a shutter speed which is automatically determined. For this purpose, an ammeter having a pointer is generally employed, but such mechanical indicators are susceptible to aging and fatigue.

SUMMARY OF THE INVENTION

It is therefore the primary object of the present invention to provide an improved electronic shutter device which may overcome these problems and which is simple in construction and adjustment and is free from temperature variation and aging.

In brief, the electronic shutter device in accordance with the present invention stores in a binary system a voltage which is logarithmatically proportional to a current generated by a photosensitive cell and indicates this voltage. A shutter control current in exponentially proportional to the value stored may be derived so as to control the shutter speeds.

BRIEF DESCRIPTION OF THE DRAWING

The drawing illustrates a block diagram of the preferred embodiment of the present invention.

DESCRIPTION OF THE PREFERRED EMBODIMENT

One exemplary embodiment of the present invention is illustrated in the drawing. One terminal of a photoelectric element P is grounded while the other terminal is connected to a stationary contact $b$ of a change-over switch $S_1$ having another stationary contact $a$. An integration capacitor C is bypassed by a switch $S_5$ with their one terminals connected to the stationary contact $a$ while the others, to a control unit F for controlling a magnet for starting and stopping a shutter, to an output terminal B of an operational amplifier $OP_1$ and to a gate GT to be described in detail hereinafter. The non-inverting input terminal (+) of the operational amplifier $OP_1$ is grounded while the inverting input terminal (−) is connected to the junction A between the change-over switch $S_1$ and a diode D. The non-inverting input terminal (+) of another operational amplifier $OP_2$ is grounded while the inverting input terminal (−) is connected through a resistor R to the output terminal of the operational amplifier $OP_2$ so as to provide a feedback loop. The output terminal of the operational amplifier $OP_2$ is connected to the junction G between the resistor R and the diode D. The inverting input terminal (−) of the operational amplifier $OP_2$ is further connected to a binary counter CU at H through resistors $R_A$, $R_B$, and $R_D$ and to an aperture-stop and film speed setting means through a contact $S_2$. The first input terminal of the gate GT is connected to a pulse generator PG1, the second input terminal B', to the output terminal of the operational amplifier $OP_1$, the third input terminal, to the non-inverting terminal (+) of the power source through a switch $S_3$, and the output terminal to the counter CU. The counter is connected to another pulse generator PG2 through a switch $S_4$ and has its output terminal connected to a decoder DEC, which in turn is connected to an indicator IND. The counter CU consists of four flip-flops $C_A$, $C_B$, $C_C$ and $C_D$ whose ON or OFF represent bits and which are connected to the resistors $R_A$, $R_B$, $R_C$ and $R_D$, respectively. The switch $S_4$ is operatively coupled to a shutter button (not shown) and the contact $S_5$ is adapted to be opened immediately when the shutter mechanism is actuated.

Next the mode of operation will be described. The movable contact of the switch $S_1$ makes contact with the stationary contact $b$. The current $i$ in proportion to the intensity of incident light intercepted by the photoelectric cell P flows into the junction A to which is connected the inverting input terminal (−) of the operational amplifier $OP_1$. When the operational amplifier $OP_1$ has a sufficiently high input impedance, the current $i$ flows into the diode D so that the voltage drop $e$ across the diode D is in proportion to a logarithm of the current $i$. The voltage drop $e$ may be given by $$e = -Eo \log (i/Io) \qquad (1)$$

where $Eo$ and $Io$ are the constants of the diode D and the voltage drop $e$ is measured between the junctions A (= reference point) and G.

The binary counter CU comprising the four flip-flops counts the pulses from the gate GT and stores them. The recurring pulses from the pulse generators $PG_1$ are applied to the gate GT, which so functions as to interrupt the transmission of the recurring pulses from the pulse generator $PG_1$ to the pulse counter CU when either or both of the input signals applied to the input terminals IH and B' are at higher level (This condition will be referred as "H level" hereinafter), since these two input signals IH AND B' to the gate GT deactivate the gate GT when either or both of these signals is at H level. When the intensity of light from the object is being measured, the switch $S_4$ is closed so that the counter CU may be periodically reset by the pulses from the pulse generator $PG_2$. It should be noted that the repetitive frequency of the pulse generator $PG_1$ must be far greater than that of the pulse generator $PG_2$. When the counter CU is reset, all of the bits ($C_A$ through $C_D$) are all reset to zeros so that no voltage is impressed across the resistors $R_A$ through $R_D$. In consequence there is no current flow from the counter CU to the junction H. However, the constant current $i_o$ representative of the aperture stop or film speed setting is applied to the junction H because the switch $S_2$ is closed when the intensity of the light from the object is being measured. Therefore the potential at the output terminal G of the operational amplifier $OP_2$ is given by $$e_{G1} = -Ri_o \quad (2)$$

The absolute value of Eq. (2) is made smaller than that of $e$ in Eq. (1) so that the potential at the junction A may be positive. In consequence, the potential at the output terminal B of the operational amplifier $OP_1$ is negative and the potential at B' is also negative. In addition, the switch $S_3$ is opened so as to interrupt the input to the input terminal IH of the gate GT, the latter may transmit the pulses from the pulse generator $PG_1$ to the counter CU.

As is known in the art, the bits ($C_A$ through $C_D$) of the counter CU have the weights of 1, 2, 4 and 8, respectively, so that the resistors $R_A$ through $R_D$ may be selected to have the resistance values of $R_A = R_1$, $R_B = R_1/2$, $R_C = R_1/4$ and $R_D = R_1/8$. That is the resistors $R_A$ through $R_D$ have the resistance values obtained by dividing the reference value $R_1$ by the weights of the bits respectively. It will be assumed that the current $i_1$ flows into the junction H from the bit $C_A$ when it is at "H level." Then the currents $2i_1$, $4i_1$ and $8i_1$ flow into the junction H from the bits $C_B$, $C_c$ and $C_D$ at H level. According to the contents of the counter CU, the current equal to 0, 1, 2, ... or 15 × $i$ representative of the shutter speeds 1, 2, 4, .... 1,000 and other shutter speeds if required may flow into the point H. Since the R is inserted in the feedback loop of the operational amplifier $OP_2$, the potential $e_G$ at the junction G of the operational amplifier $OP_2$ is given by $$e_{G2} = -(C_A + 2C_B + 4C_C + 8C_D) \cdot i_1 \cdot R \quad (3)$$

and $$e_G = e_{G1} + e_{G2} \quad (4)$$

where $C_A$ through $C_D$ are 1 or 0 depending upon whether the bits in the counter CU are in the ON or OFF state.

When the potential $e_G$ at the point G is less than $e$ in Eq. (1), the potential at the point A becomes negative while the output of the operational amplifier $OP_1$ at the output terminal B and hence at B' becomes positive. The gate GT becomes OFF state so that the counter CU stops counting. The counting result may be held in the counter CU until the reset pulses are applied thereto.

The operation described above may be cycled whenever the reset pulses are applied from the pulse generator $PG_2$. Upon depression of the shutter button, the switch $S_4$ is opened, so that the content of the counter CU may be maintained. Of course the pulse repetition rate of the pulse generator $PG_1$ must be such that the counting operation must be accomplished prior to the initiation of the lifting of the mirror after the shutter button is depressed. The pulse repetition rate of the pulse generator $PG_2$ must be sufficiently smaller than that of the pulse generator $PG_1$, but must be sufficiently faster so as not to delay the light intensity measuring speed in practice. Upon depression of the shutter button, the contact $S_4$ is first opened and the counting result is kept in the counter CU. Upon completion of counting, the contact $S_3$ is closed so that the gate GT interrupts the transmission of pulses even when the potential at B' is dropped, thereby holding the counting result in the counter CU.

Upon completion of counting, the movable contact of the switch $S_1$ is switched to the stationary contact $a$ while the contact $S_2$ is opened so that no current may flow through the contact $S_2$ into the point H. Simultaneously when the shutter starts, the contact $S_5$ is opened, the current $i'$ flows from the output terminal B of the operational amplifier $OP_1$ to the diode D through the integration capacitor C, which is therefore charged. In this case, the operational amplifier $OP_1$ is operated in the unsaturated region so that the potential at the point A is equal to zero which is the potential applied to the non-inverting input terminal (+) of the operational amplifier $OP_1$. Since the contact $S_2$ is opened, that is $$e_{G1} = 0 \quad (5)$$

the potential at the output terminal G of the operational amplifier $OP_2$ is equalized to $e_{G2}$ of Eq. (3)

When the error caused in quantatization is neglected and when the counting is accomplished, the diode voltage $e$ in Eq. (1) becomes equal to $e_G$ at the point G so that $$e_{G1} + e_{G2} = -E_o \log (i/I_o) \quad (6)$$

When the shutter is being actuated, $e_{G1}$ becomes zero as shown in Eq. (5) and the current $i'$ flows through the diode D so that $$e_{G2} = -E_o \log (i'/I_o) \quad (7)$$

Putting $$i' = i/k \quad (8)$$

we have from Eqs. (6), (7) and (8)

$$e_{G1} = E_o \log (i/kI_o) - E_o \log (i/I_o)$$
$$= -E_o \log k \quad (9)$$

From Eq. (2), we select the current $i_o$ $$i_o = E_o/R \log k \quad (10)$$

as, the ratio of the shutter control current to the light intensity measuring current.

From Eq. (7), $$i' = I_o \times 10^{-e_{G2}/E_o} \quad (11).$$

Substituting Eq. (11) into Eq. (3), we have $$i' = I_o \times 10^{(C_A + 2C_B + 4C_C + 8C_D) \cdot i_1 \cdot R/E_o} \quad (12)$$

When the shutter is controlled, the current $i'$ is integrated by the capacitor C so that the potential $e_B$ at the point B' which is equal to that at the output terminal B may be expressed with respect to time $$e_B = i' t/C \quad (13)$$

The device F for controlling the magnet which activates and deactivates the shutter mechanism is connected to the junction B'' in such a way that when the potential $e_B$ at B'' reaches a prefixed level $e_{B_o}$ the shutter is closed. The time required for the potential $e_B$ to reach the level $e_{B_o}$ may be expressed by $$i' \cdot t_o = e_{B_o} \cdot C \quad (14)$$

so that it is possible to control the shutter speed.

Substituting Eq. (14) into Eq. (12), we have $$to = \frac{e_{Bo} \cdot C}{Io} \Big/ 10^{(C_A + 2C_B + 4C_C + 8C_D) \cdot i_1 \cdot R/E_o} \quad (15)$$

Putting $$i_1 R/Eo = \log 2 \quad (16),$$

we have $$to = \frac{e_{Bo} \cdot C}{Io} \Big/ 2^{(C_A + 2C_B + 4C_C + 8C_D)} \quad (17)$$

Therefore, the shutter speeds may be determined in the series of a multiple number depending upon ON and OFF of the bits or flip-flops $C_A$ through $C_D$ in the counter CU. It should be noted that Eo remains as a constant relating to temperature, but Eo is determined linearly as the function of temperature ($Eo = 2.303 \, kt/q$, $k$: Boltzmann's constant, $T$: absolute temperature, $q$: charge of electron) so that it can easily be corrected. The ON-OFF conditions or states of the bits $C_A$ through $C_D$ in the counter CU may be converted into codes by the decoder DEC so as to display the shutter speeds by the indicator. Any suitable indicator may be employed, but for use in a camera it is advantageous to use a photoemitting diode or a multi-tip type or monothilic type indicator. The shutter speeds may be indicated by numerals, graduated scales or symbols. In the instant embodiment, in order to prevent flickering in indication, the counting result is not temporarily stored. However, the period for resetting the counter CU is made sufficiently longer than a time required for the counter CU to count so that the problems encountered in practice may be overcome. The number of bits in the counter CU may be increased in order to attain a higher degree of accuracy in measurement. The photoelectric cell P may be replaced with a suitable photoconductive element together with a suitable power source.

In summary the present invention eliminates the prior art circuit which required extremely high insulation so as to hold the charge. The electronic shutter device in accordance with the present invention is simple in construction and adjustment and is free from temperature variation and aging.

I claim:

1. In a camera having an electronically controlled shutter, an exposure control arrangement comprising;
    a. first conversion means for converting the value of the intensity of the light of the object to be photographed into a first voltage having a value proportional to a logarithm of the value of the light intensity;
    b. a pulse generator;
    c. a pulse counter connected to said pulse generator, said pulse counter counting the pulses from the pulse generator and producing a first current proportional to the counted pulses;
    d. second conversion means connected to the pulse counter for converting said first current flowing from the pulse counter into a second voltage proportional to the first current;
    e. comparison means connected to the first and second conversion means, said comparison means comparing the first voltage of said first conversion means with the second voltage of said second conversion means and producing a signal when the difference between the two voltages reaches a predetermined value;
    f. means coupling said pulse generator to said pulse counter and connected to said comparison means for preventing transmission of the pulses from said pulse generator to said pulse counter when said signal from said comparison means is applied to the coupling means, whereby the counter pulses are memorized in said pulse counter; and
    g. control means for controlling the shutter speed in response to the number of the pulses memorized in said pulse counter.

2. The exposure control arrangement as defined in claim 1 wherein said control means includes
    a. integrating circuit means having a capacitor and being coupled to said second conversion means to produce a second current proportional to an exponential function of the second voltage and to charge said capacitor with the second current upon the beginning of the opening movement of the shutter; and
    b. shutter closing means connected to said integrating circuit means for closing the shutter when the voltage across said capacitor reaches a predetermined value.

3. The exposure control arrangement as defined in claim 1, further comprising means connected to said pulse counter for regulating said first current correspondingly to variation in the film sensitivity and the objective lens aperture opening of the camera while said comparison means compares the first voltage with the second voltage.

4. The exposure control arrangement as defined in claim 1 further comprising means for regulating said first current correspondingly to variation in the film sensitivity and the objective lens aperture opening of the camera;

and switching means for connecting said regulating means to said pulse counter while the comparison means compares the first voltage with the second voltage and disconnecting said regulating means from said pulse counter after the memorization of the counted pulses in the pulse counter.

5. The exposure control arrangement as defined in claim 4 wherein one end of said switching means is connected to the regulating means and the other end of the said switching means is connected to the junction between said second conversion means and said pulse counter.

6. The exposure control arrangement as defined in claim 1 wherein the pulse counter is a binary counter.

7. The exposure control arrangement as defined in claim 1, further comprising indicator means connected to the pulse counter for indicating shutter speed corresponding to the pulses memorized in the pulse counter.

8. In a camera having an electronically controlled shutter, an exposure control arrangement comprising:
    a. a photoelectric element adapted to receive the light from the object to be photographed;
    b. a logarithm conversion means whose one end is connected to said photoelectric element, said logarithm conversion means converting the current from the photoelectric element into a voltage having a value proportional to a logarithm of the value of the light intensity;

c. a pulse generator;
d. a pulse counter connected to said pulse generator for counting the pulses from the pulse generator, said pulse counter producing a current proportional to the counted pulses;
e. means connected between the pulse generator and the pulse counter for selectively permitting transmission of the pulses from the pulse generator to the pulse counter and preventing said transmission;
f. second conversion means whose one end is connected to the pulse counter for receiving the current produced from the pulse counter and the other end is connected to the other end of said logarithm conversion means, said second conversion means converting the current from the pulse counter into a voltage proportional to the current from the counter;
g. comparison means for comparing the voltage of the logarithm conversion means with the voltage of the second conversion means, said comparison means including first and second operational amplifiers, said first operational amplifier having an inverting input terminal connected to the junction between the pulse counter and the second conversion means, a grounded non-inverting input terminal, and an output terminal connected to the junction between the logarithm conversion means and the second conversion means, said second operational amplifier having an inverting input terminal connected to the one end of the logarithm conversion means, a grounded non-inverting input terminal, and an output terminal connected to the selectively preventing means, said comparison means producing a signal at the output terminal of the second operational amplifier to cause said means connected between the pulse generator and the pulse counter to prevent said transmission of the pulses when the difference between said two voltages reaches a predetermined value, whereby the counted pulses are memorized in the pulse counter;

h. first switching means for connecting the photoelectric element to the junction between the inverting input terminal of the second operational amplifier and the one end of the logarithm conversion means while the comparison means compares the voltage of the logarithm conversion means with the voltage of the second conversion means and disconnecting the photoelectric element from the junction between the second amplifier and the logarithm conversion means after memorization of the counted pulses in the pulse counter;

i. capacitor means;
j. second switching means for connecting the capacitor means between the output terminal of the second amplifier and the inverting input terminal of the second amplifier after the first switching means disconnects the photoelectric element from the junction between the second amplifier and the logarithm conversion means, said capacitor means being charged with the current flowing through the logarithm conversion means from the output terminal of the second amplifier when the shutter is opened; and k. shutter closing means for closing the shutter when the voltage across the capacitor reaches a predetermined value.

9. The exposure control arrangement as defined in claim 8 wherein the capacitor means includes third switching means for short-circuiting said capacitor while the third switching means is closed and for charging said capacitor while the third switching means is opened, said third switching means being opened in response to the opening movement of the shutter.

10. The exposure control arrangement as defined in claim 8 wherein said means connected between the pulse generator and the pulse counter has first and second input terminals, the first input terminal being connected to the output terminal of the second operational amplifier for receiving said signal therefrom, a signal generator connected to the second input terminal to apply a signal from the signal generator to said second input terminal after the signal from the output terminal of the second operational amplifier is applied to the first input terminal, said means connected between the pulse generator and the pulse counter preventing said transmission from the pulse generator to the pulse counter when at least one of the signals from the output terminal of the second operational amplifier and said signal generator is applied to said means connected between the pulse generator and the pulse counter.

* * * * *